US010648150B2

(12) United States Patent
Henderson

(10) Patent No.: US 10,648,150 B2
(45) Date of Patent: May 12, 2020

(54) RETROFIT REINFORCING STRUCTURE ADDITION AND METHOD FOR WIND TURBINE CONCRETE GRAVITY SPREAD FOUNDATIONS AND THE LIKE

(71) Applicant: Allan P. Henderson, Bakersfield, CA (US)

(72) Inventor: Allan P. Henderson, Bakersfield, CA (US)

(73) Assignee: TERRACON CONSULTANTS, INC., Olathe, KS (US)

( * ) Notice: Subject to any disclaimer, the term of this patent is extended or adjusted under 35 U.S.C. 154(b) by 0 days.

(21) Appl. No.: 15/585,775

(22) Filed: May 3, 2017

(65) Prior Publication Data

US 2017/0233975 A1    Aug. 17, 2017

Related U.S. Application Data

(62) Division of application No. 14/870,955, filed on Sep. 30, 2015, now Pat. No. 9,783,950.

(Continued)

(51) Int. Cl.
*E02D 27/42* (2006.01)
*E02D 5/80* (2006.01)
(Continued)

(52) U.S. Cl.
CPC ............. *E02D 27/425* (2013.01); *E02D 5/80* (2013.01); *E02D 27/08* (2013.01); *E02D 37/00* (2013.01);
(Continued)

(58) Field of Classification Search
CPC ......... E02D 27/425; E02D 5/80; E02D 27/08; E02D 37/00; E02D 2300/00; E02D 2600/30; E02D 2250/0023; E02D 2200/12
See application file for complete search history.

(56) References Cited

U.S. PATENT DOCUMENTS 2,948,995 A * 8/1960 Cogan ....................... E04B 1/21
264/228
5,761,875 A * 6/1998 Oliphant ............... E04B 1/4121
248/218.4
(Continued)

FOREIGN PATENT DOCUMENTS

JP            11013150 A * 1/1999

*Primary Examiner* — Basil S Katcheves
*Assistant Examiner* — Omar F Hijaz
(74) *Attorney, Agent, or Firm* — Jacobson Holman, PLLC.

(57) ABSTRACT

A retrofit reinforcing structure addition and method for an existing gravity spread foundation for a wind turbine or the like having a central pedestal and a spread section is provided. The retrofit structure addition includes a collar formed around the pedestal of the spread foundation. The collar is formed by a shape sustaining member, such as a CMP, placed around the pedestal to define an annular ring between the CMP and the pedestal that is filled with cementitious material. Radial bolts extend horizontally through the collar and into the side of the pedestal. Soil and/or rock anchor bolts extend vertically through the collar, the spread portion of the foundation and into the underlying soil and/or rock substrate. The radial and anchor bolts are post-tensioned to ensure that the cementitious material of the collar remains in compression and the bolts are always in static tension, strengthening the original gravity spread foundation and extending the fatigue life thereof.

14 Claims, 13 Drawing Sheets

Related U.S. Application Data

(60) Provisional application No. 62/211,158, filed on Aug. 28, 2015, provisional application No. 62/060,743, filed on Oct. 7, 2014.

(51) Int. Cl.
  *E04C 5/12* (2006.01)
  *E02D 37/00* (2006.01)
  *E02D 27/08* (2006.01)

(52) U.S. Cl.
  CPC ............... *E04C 5/12* (2013.01); *E02D 27/42* (2013.01); *E02D 2200/12* (2013.01); *E02D 2250/0023* (2013.01); *E02D 2300/00* (2013.01); *E02D 2600/30* (2013.01)

(56) References Cited

U.S. PATENT DOCUMENTS

| | | |
|---|---|---|
| 5,826,387 A | 10/1998 | Henderson et al. |
| 6,672,023 B2 | 1/2004 | Henderson |
| 7,155,875 B2 | 1/2007 | Henderson |
| 7,533,505 B2 | 5/2009 | Henderson |
| 8,261,502 B2* | 9/2012 | Andersen ................ E02D 27/42 52/296 |
| 2002/0124502 A1* | 9/2002 | Henderson ............ E02D 27/42 52/296 |
| 2002/0152695 A1* | 10/2002 | Gilsdorf .................. E02D 27/42 52/98 |
| 2006/0048471 A1* | 3/2006 | Lee ......................... E02D 27/00 52/296 |
| 2011/0061321 A1* | 3/2011 | Phuly ..................... E02D 27/42 52/297 |
| 2012/0047830 A1* | 3/2012 | Phuly ..................... E02D 27/42 52/294 |
| 2012/0291394 A1* | 11/2012 | Tooman ................ E02D 27/42 52/699 |
| 2013/0255169 A1* | 10/2013 | Henderson ............ E04C 5/125 52/223.13 |
| 2014/0260023 A1* | 9/2014 | Henderson ............ E02D 27/50 52/295 |
| 2014/0348663 A1* | 11/2014 | Schacknies ........... F03D 11/045 416/244 R |
| 2015/0075099 A1* | 3/2015 | Pantelides ............ H04W 16/26 52/423 |

\* cited by examiner

RETROFIT REINFORCING STRUCTURE ADDITION AND METHOD FOR WIND TURBINE CONCRETE GRAVITY SPREAD FOUNDATIONS AND THE LIKE

This application is a divisional of co-pending U.S. application, Ser. No. 14/870,955 filed Sep. 30, 2015, which claimed priority from U.S. provisional application, Ser. No. 62/060,743 filed Oct. 7, 2014, and also claims the priority of U.S. provisional application, Ser. No. 62/211,158 filed Aug. 28, 2015, and hereby claims the priority thereof to which it is entitled.

BACKGROUND OF THE INVENTION

Field of the Invention

The present invention is related to the field of foundations for the support of tall, heavy and/or large towers and, more particularly, to a retrofit structure addition and method for reinforcing existing concrete gravity spread foundations currently used to support wind turbines and similar structures, especially those foundations which have failed or are failing due to long term dynamic fatigue.

Description of the Related Art

Concrete gravity spread foundations are often used to support turbines in the 1.5 megawatt (MW) range of which there are several thousand in the U.S. Conventional gravity spread foundation construction relies on reinforced concrete theory and designs which is inappropriate for very dynamic structures like a wind turbine. As a result, these gravity spread foundations are susceptible to long term fatigue failures which can result in collapse of the foundation. Such collapses have been known to occur after as few as 8 to 13 years, well before the expiration of turbine life which is on the order of 20-25 years or more. Therefore, there is a need for a structure and method by which gravity spread foundations may be reinforced to extend their fatigue life well beyond the turbine life.

SUMMARY OF THE INVENTION

In view of the foregoing, the present invention is directed to a retrofit spread foundation reinforcing structure and method for restoring the integrity of existing gravity spread foundations and extending the useful life thereof. The retrofit spread foundation reinforcing structure includes a generally cylindrical shape sustaining member forming an annular cementitious reinforcing collar addition positioned around the central pedestal and above the expanded base or horizontal spread section of an original gravity spread foundation. The shape sustaining member forming the annular collar addition may be embodied as a corrugated metal pipe (CMP) having a diameter greater than the diameter of the pedestal. A ring of cementitious material is poured into and fills the annular area between the outer side of the central pedestal and the surrounding shape sustaining member or CMP. The collar addition thus fully encircles and confines the central pedestal with the base of the collar pressing against the upper surface of the horizontal, spread section of the already existing spread foundation adjacent to the engaging interface between the bottom of the pedestal and the top of the spread foundation below the pedestal. A plurality of radially extending bolts extend horizontally through the CMP and cementitious ring of the collar and into the pedestal of the original foundation. Soil and/or rock anchor bolts are placed to extend vertically from the top of the cementitious ring of the collar addition down through the horizontal spread section and into the underlying soil and/or rock substrate beneath the spread section. The terms "soil and/or rock anchor bolts" or "anchor bolts" are used herein for ease of description and are understood by those skilled in the art to include tensioning and/or connecting anchors embodied as bolts as well as anchors having tensioning and/or connecting components other than bolts.

The radial bolts and soil and/or rock anchor bolts are post-tensioned in the manner described in my earlier patents, U.S. Pat. Nos. 7,533,505, 5,826,367, 6,672,023, and 7,155,875, all of which are hereby incorporated by reference in their entirety as if fully set forth herein and sometimes are referred to herein as "my prior patents", to place the entire foundation under high unit compression loading in both the horizontal and vertical directions which strengthens the cold joint interface between the pedestal and the spread section. The soil and/or rock anchor bolts are tightened so as to exceed the maximum uplift expected from overturning forces of the wind turbine structure on the foundation. As a result, the entire foundation with the reinforcing collar addition is able to withstand the various loads with the concrete thereof always remaining in compression and the bolts always in static tension.

Accordingly, it is an object of the present invention to provide a retrofit spread foundation reinforcing structure addition and method that restores the integrity of existing gravity spread foundations and extends the useful life thereof for many additional years.

Another object of the present invention is to provide a retrofit spread foundation reinforcing structure addition in accordance with the preceding object that includes a reinforcing collar positioned around the central pedestal and above the expanded base or horizontal spread section of a gravity spread foundation.

A further object of the present invention is to provide a retrofit spread foundation reinforcing structure addition in accordance with the preceding objects in which the collar includes a CMP having a diameter greater than an outer diameter of the pedestal to encircle the pedestal, an area between the CMP and the pedestal being filled with cementitious material to define an annular ring bounded on an outer perimeter by the CMP, the base of the collar resting on, or pressing against, the upper surface of the horizontal spread section of the foundation.

Yet a further object of the present invention is to provide a retrofit spread foundation reinforcing structure addition in accordance with the preceding objects that includes post-tensioned soil and/or rock anchor bolts extending vertically from the top of the cementitious annular ring of the collar down through the horizontal spread section of the foundation and into the underlying soil and/or rock substrate.

Still a further object of the present invention is to provide a retrofit spread foundation reinforcing structure addition in accordance with the preceding objects that includes post-tensioned radially extending bolts that extend horizontally through the CMP and annular cementitious collar and into the pedestal of the foundation.

Another object of the present invention is to provide a retrofit spread foundation reinforcing structure addition in accordance with the preceding objects that, when installed on an existing gravity spread foundation, places the retrofit portion of the foundation under high unit compression loading through tightening of the anchor bolts so as to exceed the maximum internal tension expected from overturning forces of the wind turbine structure on the foundation.

Yet another object of the present invention is to provide a retrofit spread foundation reinforcing structure addition in accordance with the preceding objects that may be efficiently installed in support of gravity spread foundations of various configurations.

Still another object of the present invention is to provide a method of installing a retrofit spread foundation reinforcing structure addition in accordance with the preceding objects that includes placement of a CMP around the base of the pedestal of a spread foundation structure and filling the annular area between the CMP and the pedestal with cementitious material to form a collar that encircles and supports the spread foundation pedestal.

Yet a further object of the present invention is to provide a method of installing a retrofit spread foundation reinforcing structure addition in accordance with the preceding objects in which soil and/or rock anchor bolts are installed vertically through the collar and horizontal spread section of the original foundation and into the underlying soil and/or rock substrate either before or after the cementitious material is poured into the annular ring between the CMP and the pedestal to reinforce the cold joint engaging interface between the bottom of the pedestal and the upper surface of the central part of the spread section below the pedestal.

Another object of the present invention is to provide a method of installing a retrofit spread foundation reinforcing structure addition in accordance with the preceding objects in which the anchor bolts are post-tensioned in a specified sequence to place uniform tension on the foundation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
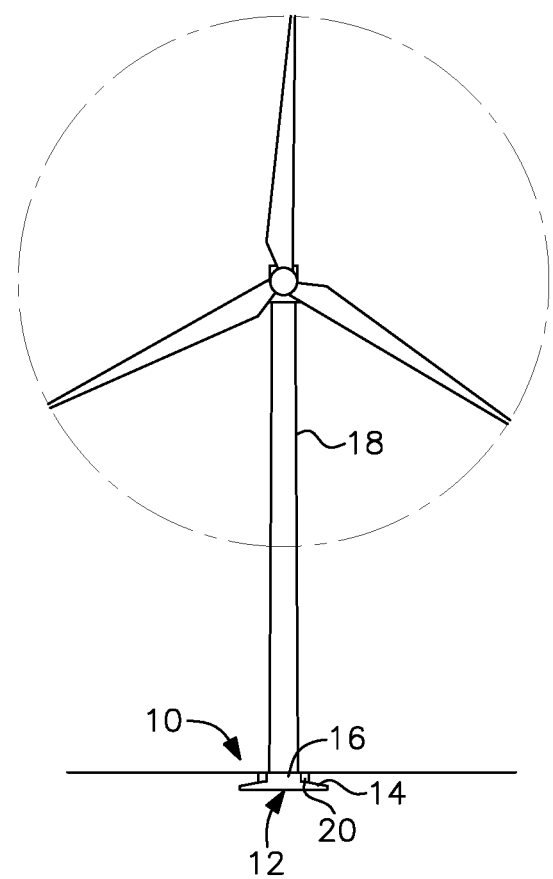
FIG. 1 is a front view of a wind turbine supported on a conventional gravity spread foundation with the retrofit spread foundation reinforcing structure addition installed thereon in accordance with the present invention.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

As shown in FIG. 1, the present invention is directed to a foundation collar reinforcing structure addition, generally designated by reference numeral 10, for a conventional existing gravity spread foundation generally designated by reference numeral 12. The gravity spread foundation 12 includes an expanded base or horizontal spread section 14 and a central pedestal 16 upon which a tall and/or heavy tower such as a wind turbine, generally designated by reference numeral 18, is supported. The reinforcing structure addition 10 according to the present invention includes an annular collar 20, positioned around the central pedestal 16 and above the expanded base or horizontal spread section 14 of the gravity spread foundation 12 to confine the pedestal. The reinforcing structure addition 10 also exerts compressive force to strengthen the engaging interface 17 which is a cold joint between the bottom of the pedestal and the top of the central part of the spread section under the pedestal 16.

Figure 2:
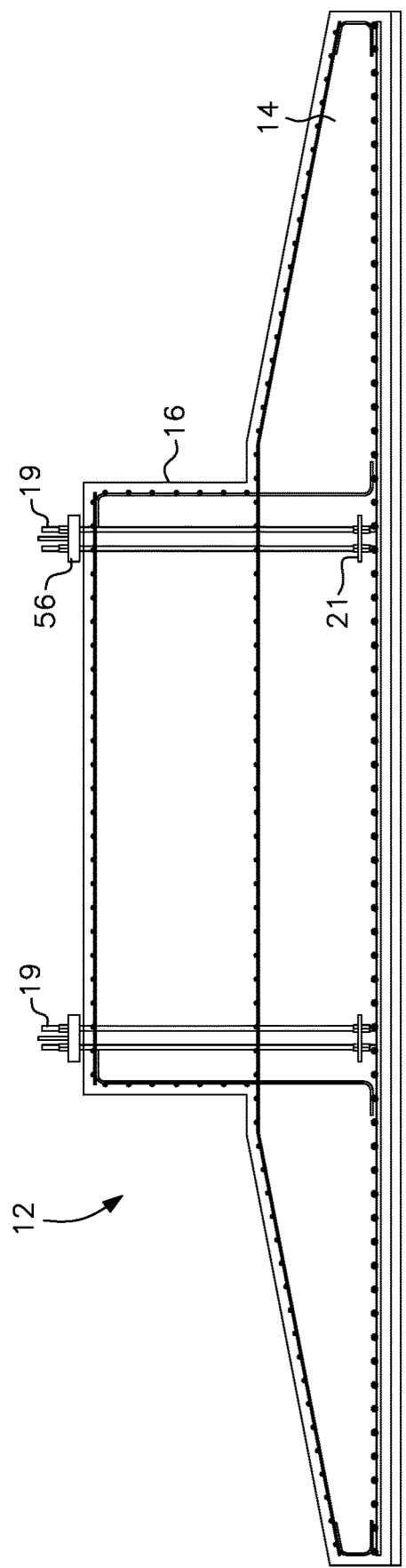
FIG. 2 is a sectional side view of one type of conventional concrete gravity spread foundation.
Figure 3:
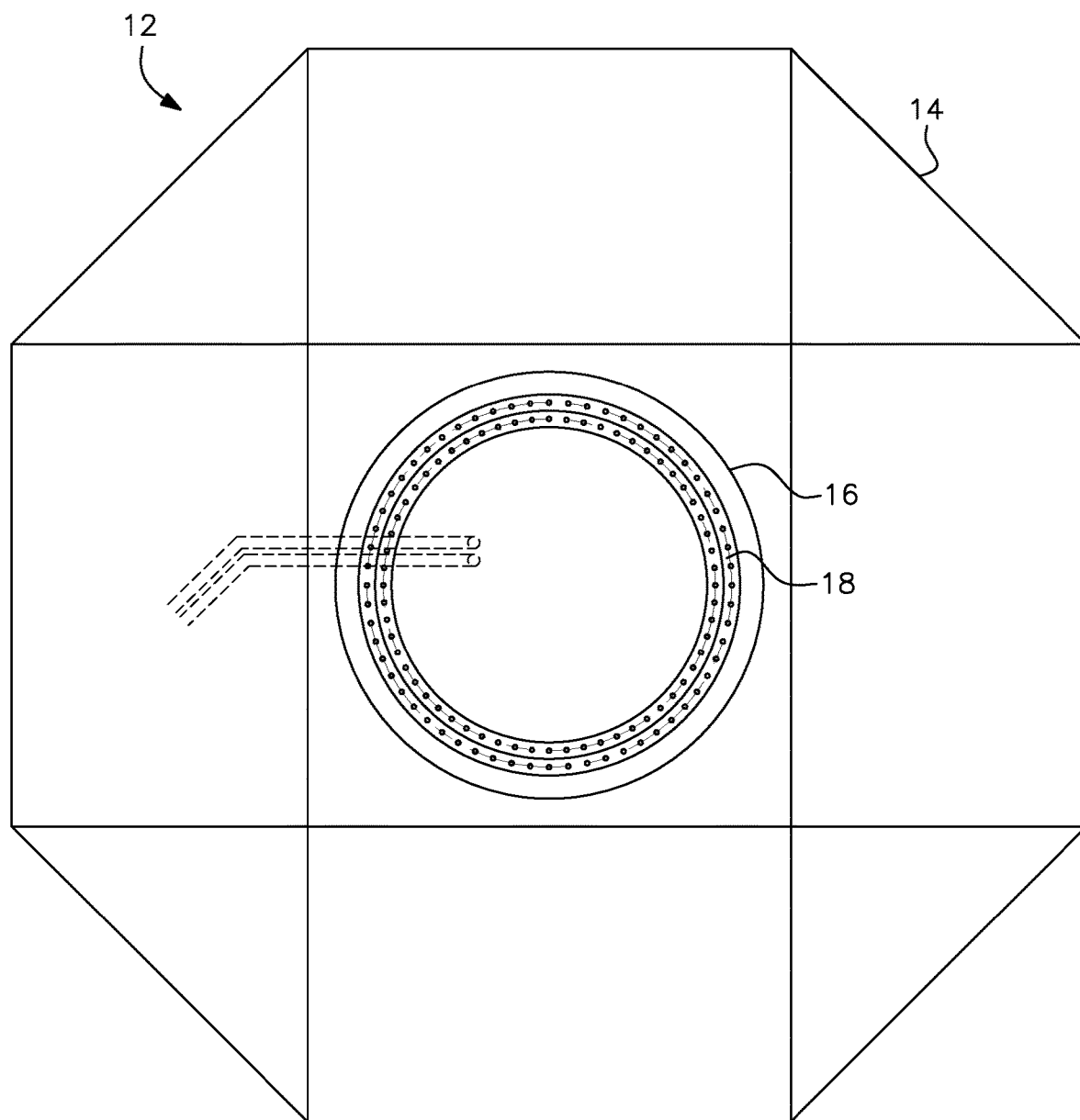
FIG. 3 is a top view of the conventional spread foundation shown in FIG. 2.

As shown in isolation in FIGS. 2 and 3, the horizontal spread section 14 of the existing gravity spread foundation 12 extends outwardly on all sides of the pedestal 16 and may be octagonal as shown in FIG. 3, or other shapes such as circular, square and the like. The tower 18 is secured to the pedestal 16 with a plurality of tower anchor bolts 19 that are secured at their lower ends to an embedment ring 21 as is known in the art and described in my prior patents.

Figure 4:
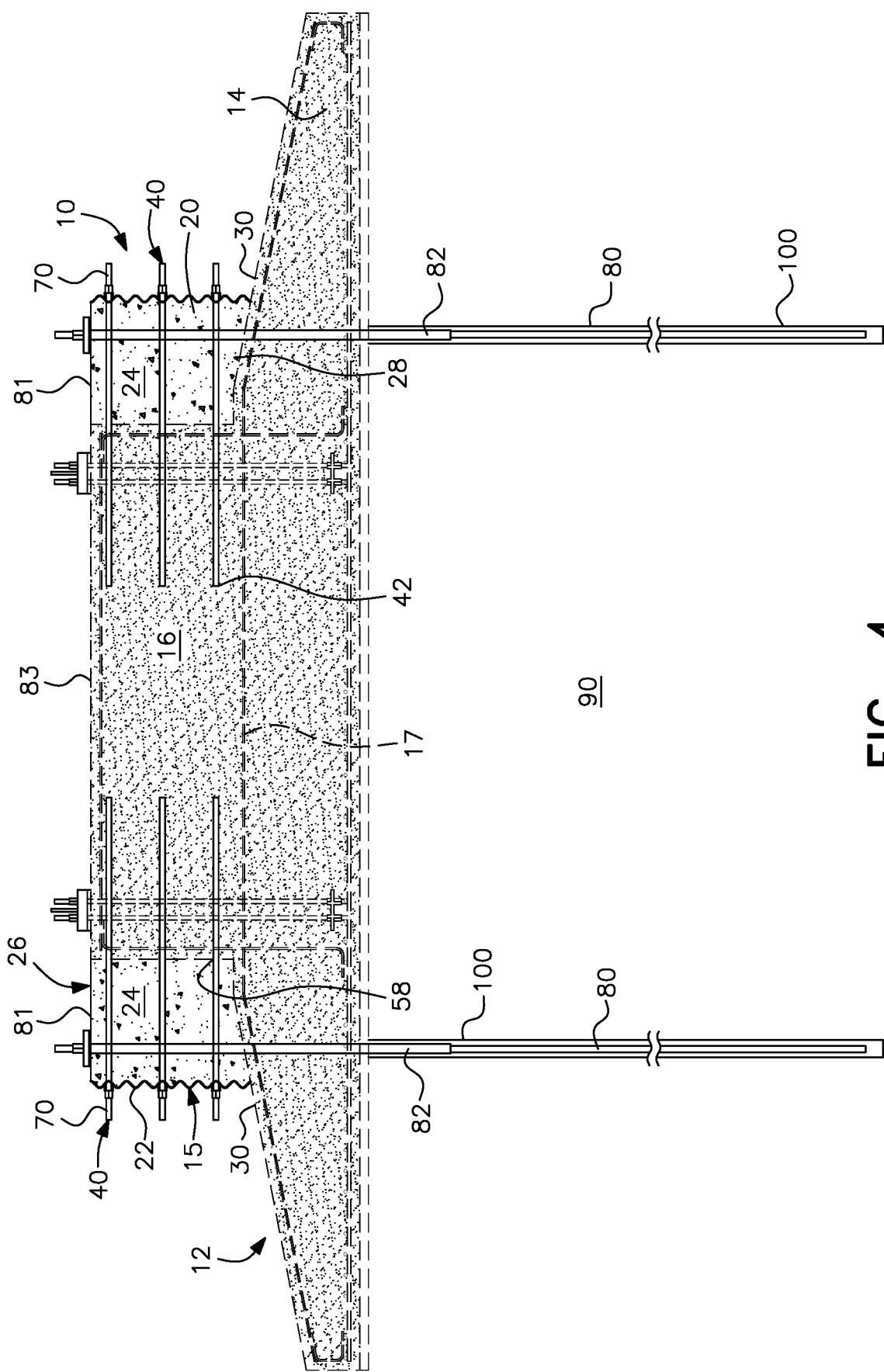
FIG. 4 is a sectional side view of the conventional spread foundation shown in FIG. 2 with the retrofit spread foundation reinforcing structure addition installed thereon in accordance with the present invention.

As best shown in FIG. 4, the collar 20 as positioned around the central pedestal 16 and above the expanded base or horizontal spread section 14 of the gravity spread foundation 12, includes a shape sustaining member, generally designated by reference numeral 15, around its outer perimeter and a ring of cementitious material 24. The shape sustaining outer member 15 is preferably embodied as a corrugated metal pipe (CMP) 22 and will be referred to as such hereinafter. However, other perimeter forming structures could be used as long as such alternate structures properly define the periphery of the ring of cementitious material and provide for post tensioning of the radial bolts and the soil and/or anchor bolts as discussed herein.

The CMP 22 is generally constructed of a plurality of sections that are bolted together to form a circle or a generally circular ring. The diameter of the CMP 22 is greater than the diameter of the foundation pedestal 16 and defines the outer perimeter of the ring of cementitious material 24 which is poured into and fills the annular area, generally designated by reference numeral 26, between the outer side of the pedestal 16 and the CMP 22. The collar 20 thus fully encircles the central pedestal 16 with the base 28 of the collar 20 resting on the upper surface 30 of the horizontal spread section 14 of the foundation 12 (see FIG. 4). As measured from the outer side surface of the pedestal to the CMP, the width or thickness of the cementitious annular collar when completed is preferably about 3.5'.

Alternatively, collar 20 does not have to rest directly on the upper surface 30 of the spread section 14 of the foundation since a layer of material could be interposed between the collar and the top of the spread section. However, the collar must press against the spread section 14 in accordance with the present invention.

The upper surface 81 of the collar bounded by the CMP 22 is preferably about level with the upper surface 83 the foundation pedestal 16. The top and bottom of the CMP are preferably cut to form a plane that varies no more than about +/−2" from level. The diameter of the CMP is generally between about 19' and about 25', with a CMP pipe tolerance for out of roundness of about 3".

Figure 5:
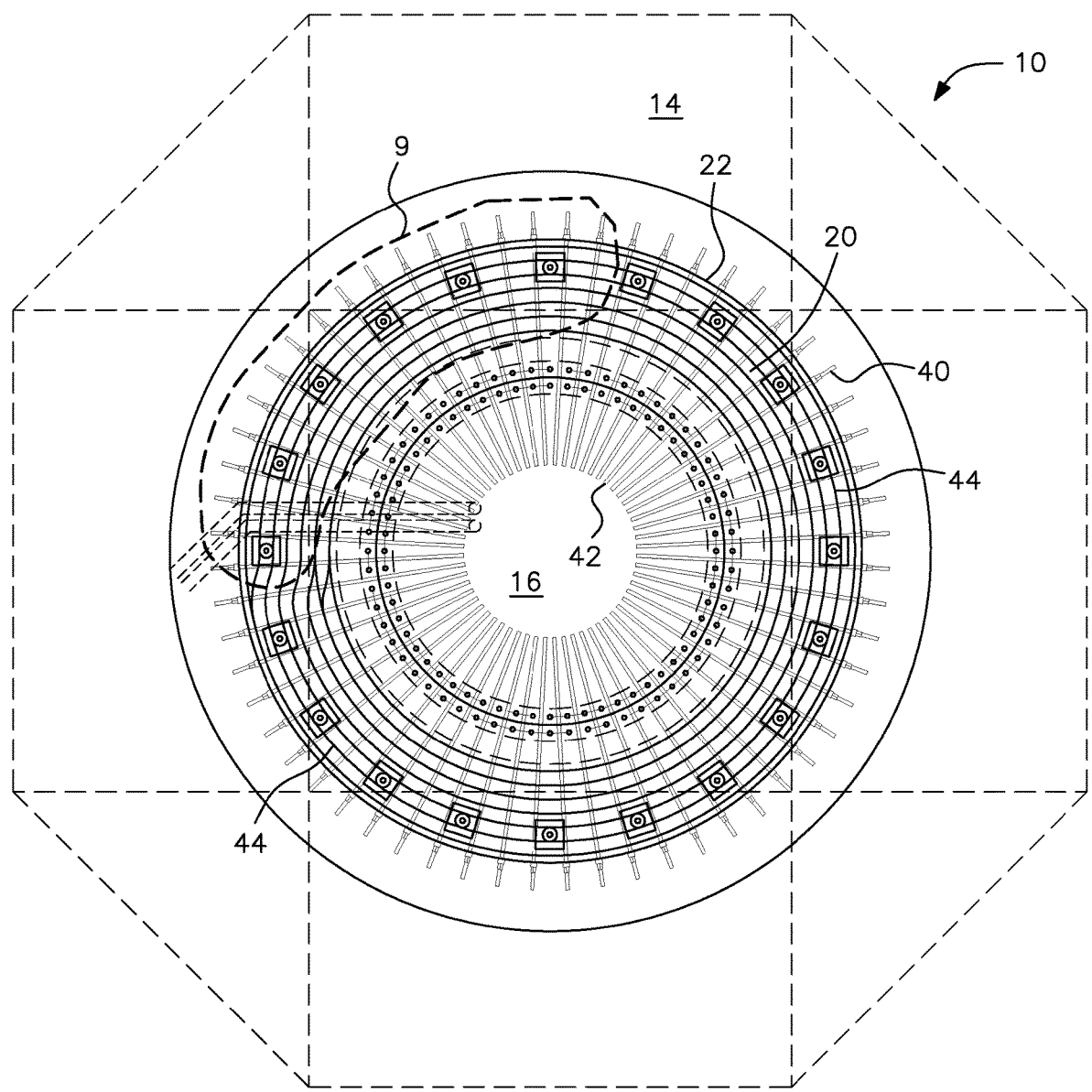
FIG. 5 is a top view of the conventional spread foundation reinforced with the retrofit spread foundation reinforcing structure addition shown in FIG. 4.
Figure 5A:
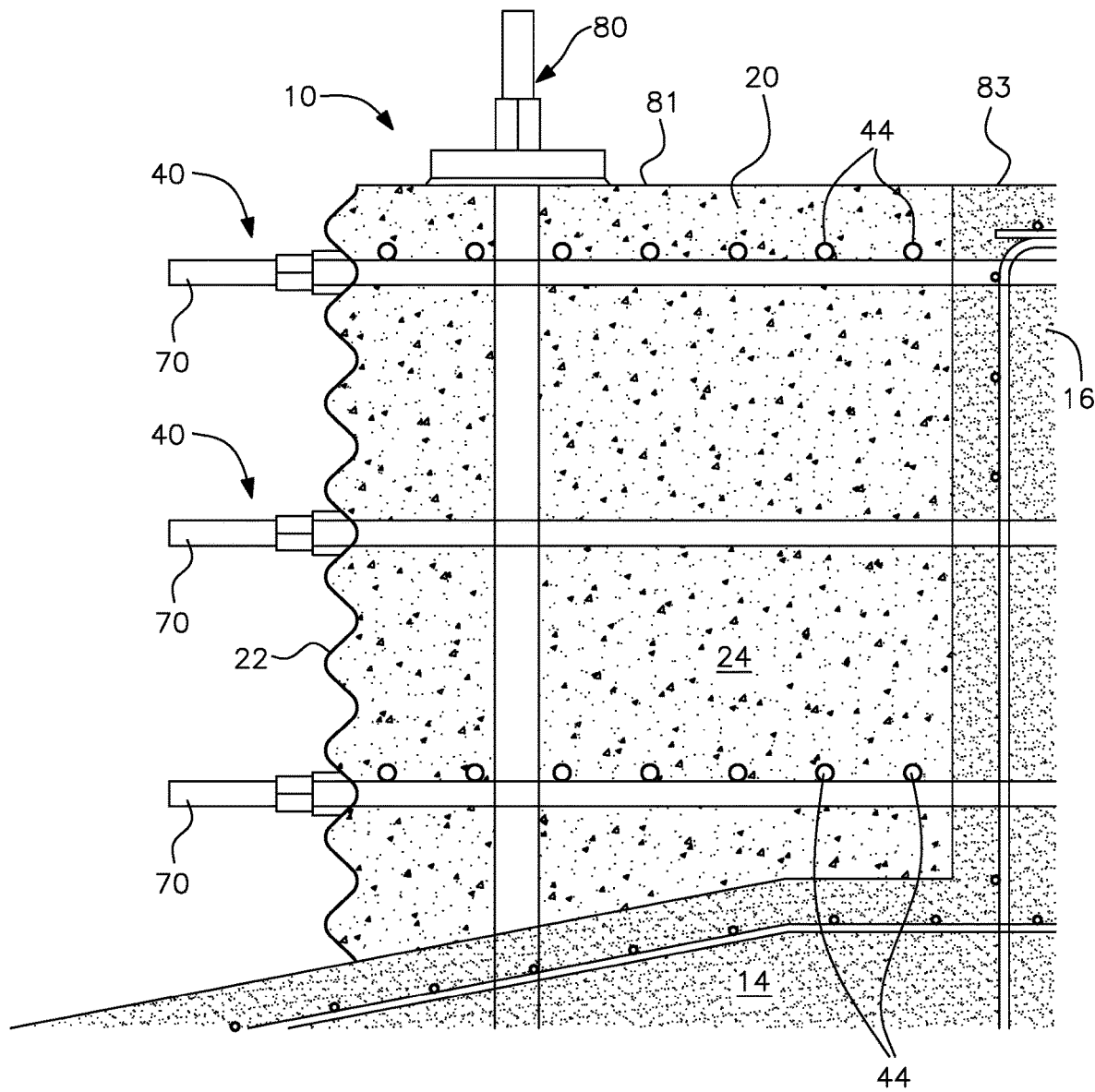
FIG. 5A is a side cutaway view of the collar showing the radial bolts and strand hoops.

A plurality of radially extending bolts generally designated by reference numeral 40 with strand hoops 44 extend horizontally through the CMP 22 and the cementitious material 24 of the annular ring 26 of the collar 20 and into the pedestal 16 of the foundation 12 as can be seen in FIGS. 4, 5 and 5A. The upper and lower bolt layers are circumferentially reinforced by the wire tied strand hoops 44 at about 6" intervals. The innermost ends generally designated by reference numeral 42 of the radial bolts 40 are received into holes 58 drilled into the side of the pedestal 16 while the length of the radial bolts that extends through the cementitious ring 26 is preferably enclosed within a sleeve 68 (see FIGS. 7A-7D) to prevent the bolts from bonding with or adhering to the cementitious material 24 when poured and cured. The radial bolts 40, which anchor the collar 20 to the pedestal 16 of the foundation 12, are post-tensioned once the cementitious material has hardened, preferably to about 40% of their ultimate strength. Preferably, washers fitting into the corrugation of the CMP and having a flat outer surface to contact the tensioning nuts are placed against the outer side of the CMP for proper tensioning of the radial bolts, as is known in the art. Alternatively or additionally, tension plates may be placed on the inside or the outside of the CMP for the seine purpose.

Figure 6A:
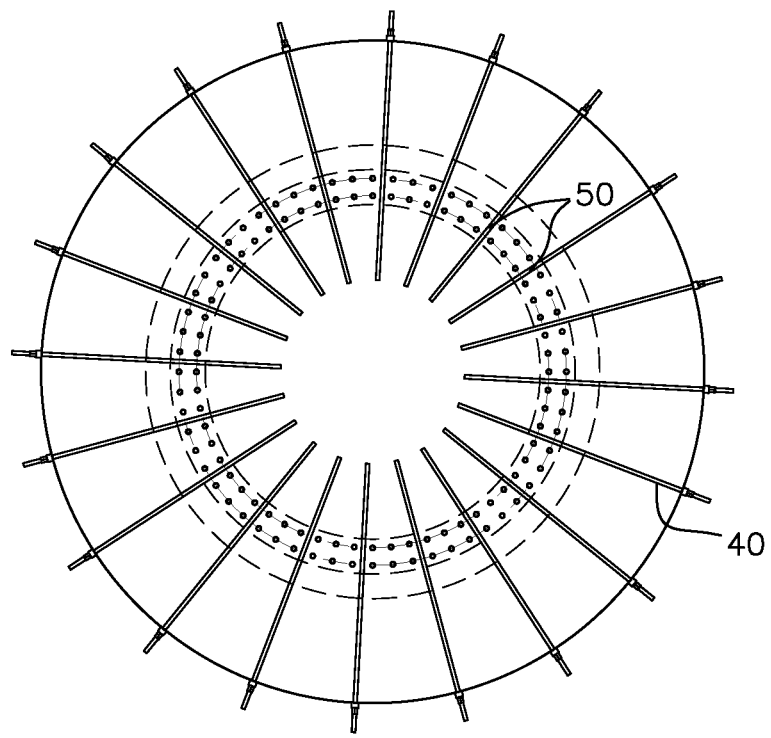
FIGS. 6A-6C are top cutaway views of each of three respective layers of radial bolts as installed according to the retrofit structure and method of the present invention.
Figure 6B:
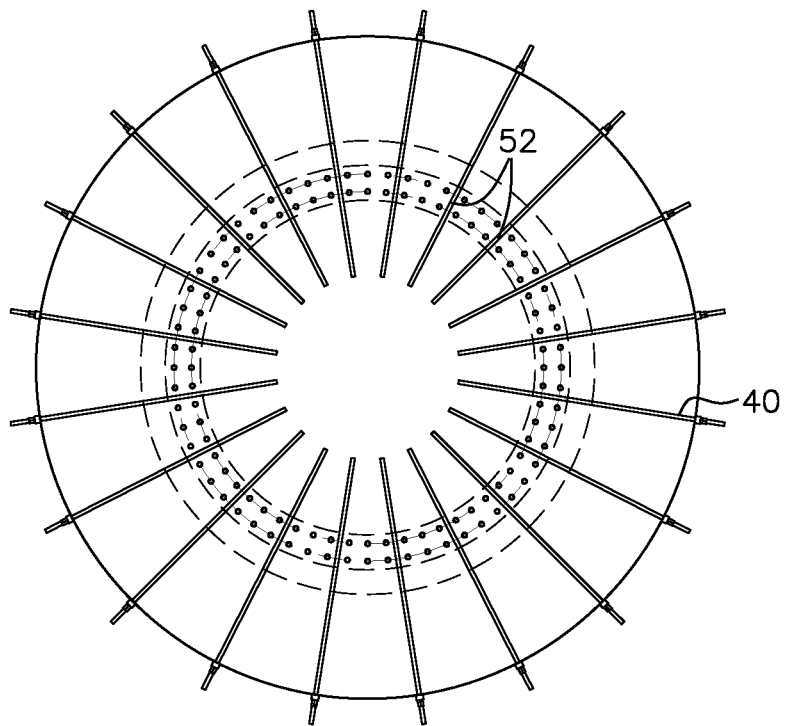
Figure 6C:
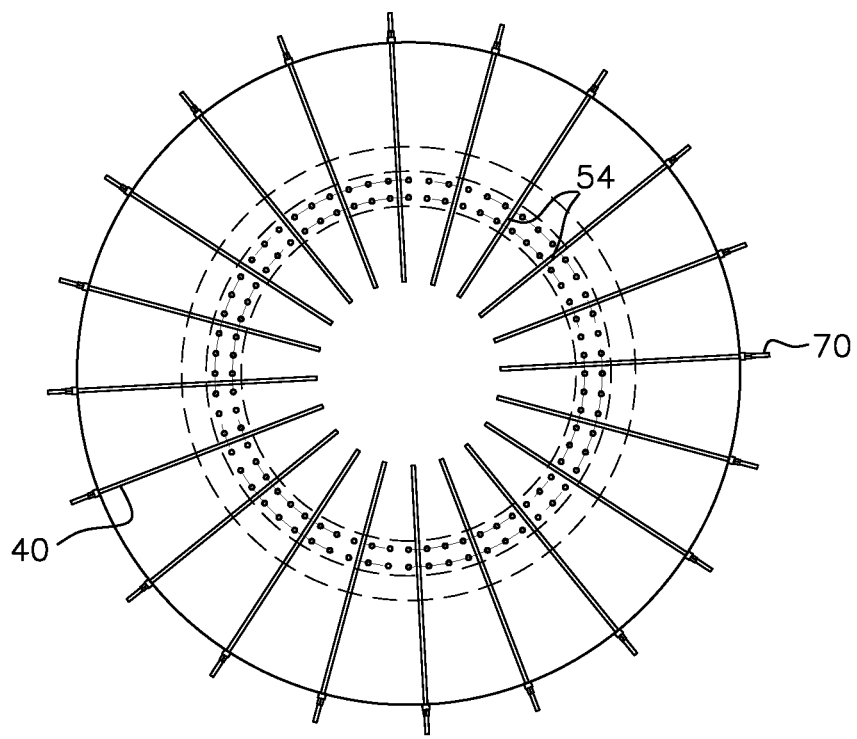
Figure 6D:
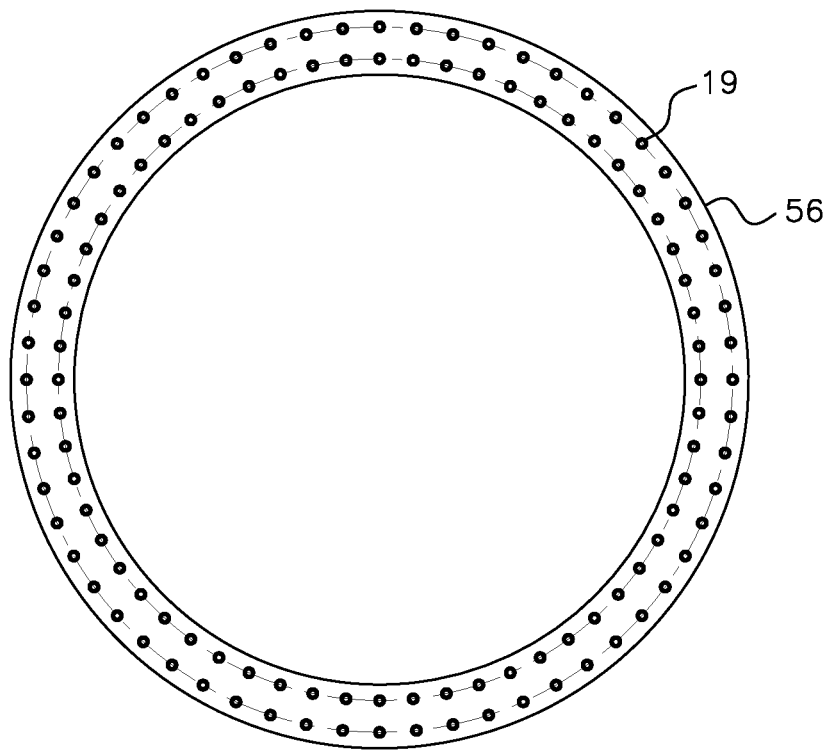
FIG. 6D is an isolated top view of the existing spread foundation tower base flange as shown in relationship to the radial bolts in FIGS. 6A-6C.

As shown in FIGS. 6A, 6B and 6C, there are preferably three layers of radial bolts 40 including a top layer 50, a middle layer 52 and a bottom layer 54. The radially extending bolts 40 in each layer are on substantially the same plane and equidistantly spaced from one another like the spokes of a wheel. As between layers, the bolts in each layer are offset with respect to the bolts in the other layers so that, if the three layers were placed directly on top of one another, none of the bolts of one layer would be in vertical alignment with the bolts in the adjacent layers. In addition, the radial bolts are positioned, so as not to interfere with the tower anchor bolts 19 in the existing tower base flange 56 shown in isolation in FIG. 6D.

Figure 7A:
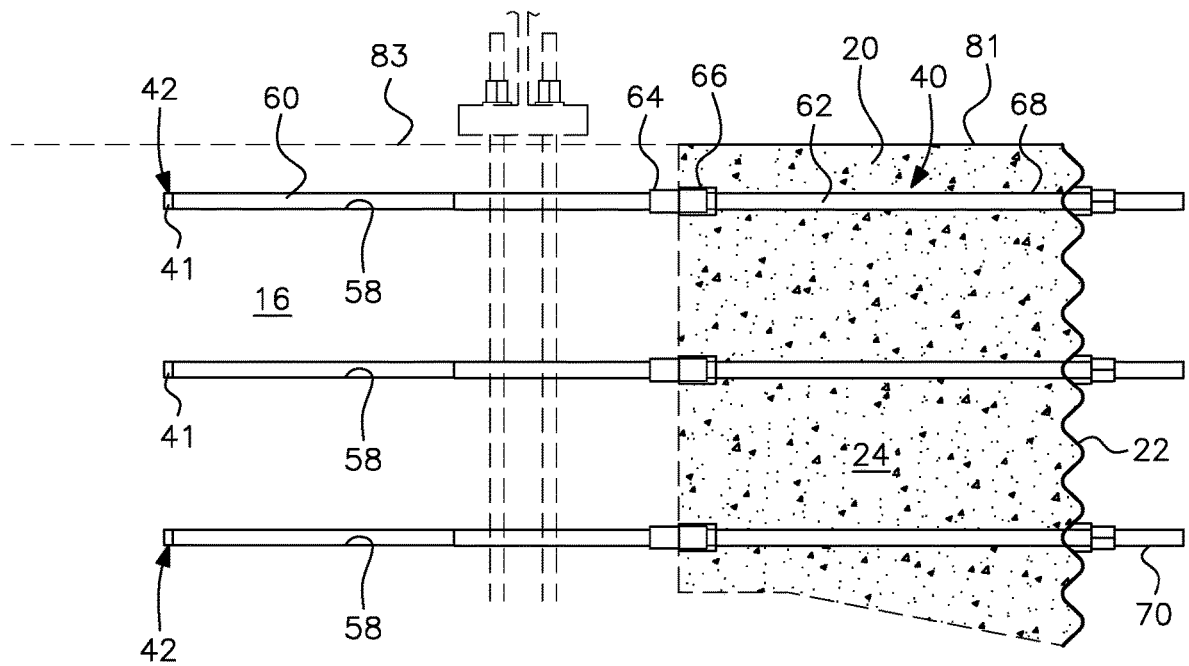
FIGS. 7A and 7B are side views of the three radial bolt layers shown in FIGS. 6A-6C showing the vertical spacing in their layered configuration as when installed.
Figure 7B:
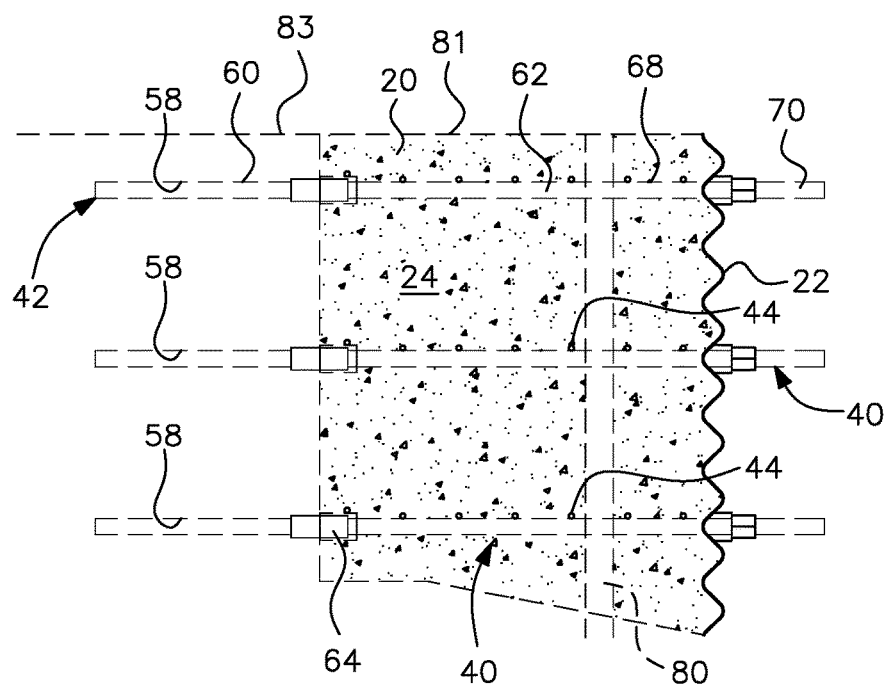

As shown in FIGS. 7A and 7B, the radial bolt layers 50, 552, 54 are vertically spaced from one another with the area between and around the layers being filled with the cementitious material 24 of the annular collar 20. The vertical spacing between the layers is preferably about between about 12" and about 18", and more preferably about 18". The diameter of the radial bolts 40 is preferably between about 1" and about 2".

The radial bolts 40 are preferably inserted into core holes 58 that are drilled into the side of the central pedestal of the existing gravity spread foundation to a depth of between about 36" to about 60", and preferably about 54". The diameter of the radial bolt core holes 58 descends in increments as the drilling approaches the center of the pedestal. The core hole at the CMP and inward for about 3" has a diameter of about 2.5". For the next approximately 21" the core hole has a diameter of about 2". The final 30' or so of the hole has a diameter of about 1.75". The innermost ends 42 of the radial bolts 40 are preferably secured within the drilled foundation core holes 58 with an adhesive such as epoxy 41 that is inserted into the holes during installation of the radial bolts. Preferably the part 62 of the radial bolts that extends through the collar is covered with a sleeve 68 having a length of between about 15" and about 26", and preferably about 21".

Figure 7C:
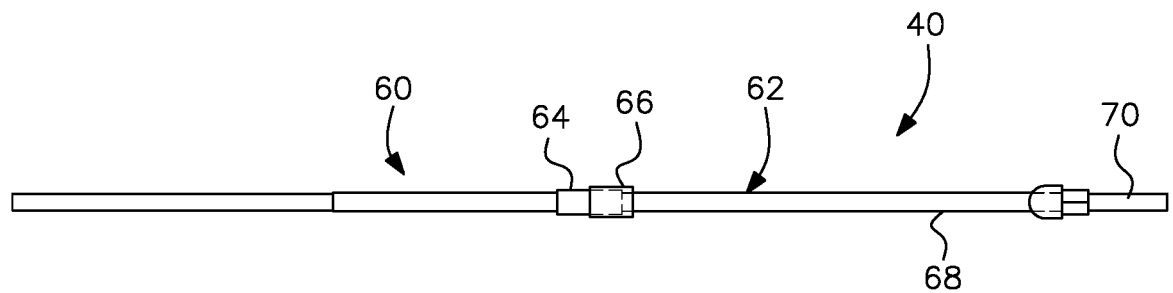
FIG. 7C is an enlarged view of a radial bolt like those shown in FIGS. 7A and 7B.
Figure 7D:
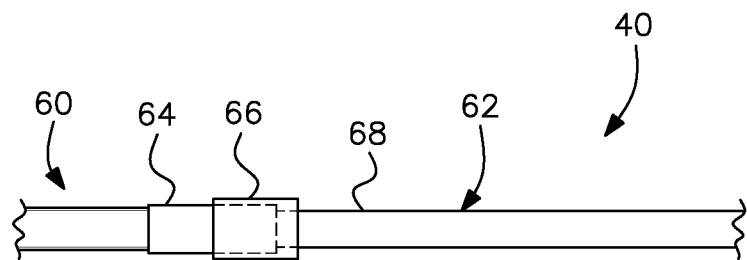
FIG. 7D is an enlarged view of the coupler for the radial bolts shown in FIGS. 7A-7C.

As shown in the embodiment of FIGS. 7C and 7D, the radial bolts include two parts. The collar embedded part 62 of the radial bolts 40 is preferably joined with the foundation embedded sleeved part 60 of the radial bolts 40 by a coupler 64. The coupler 64 is preferably enclosed within a sleeve 66 having a diameter of about 2.5" and a length of about 4". The collar portion 62 of the radial bolts is preferably between about 4' and about 5' in length, and more preferably about 4.5', and preferably is also encased within a sleeve 68 to prevent engagement of the radial bolt with the cementitious material. After tensioning, the outer ends 70 of the radial bolts extend approximately 12" beyond the outer perimeter of the collar CMP 22, although the length of the projecting ends 70 may be greater or lesser as needed for the particular foundation being reinforced.

Figure 8A:
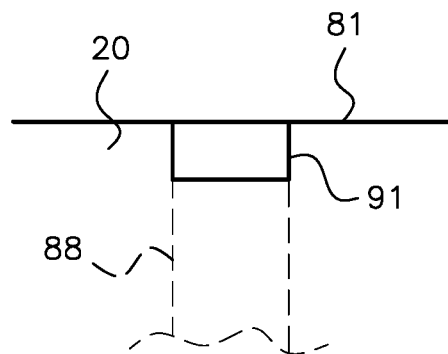
FIG. 8A is an enlarged view of the drill hole sleeve and foam fill used when the reinforcing collar is constructed before the anchor bolts are in place.
Figure 8:
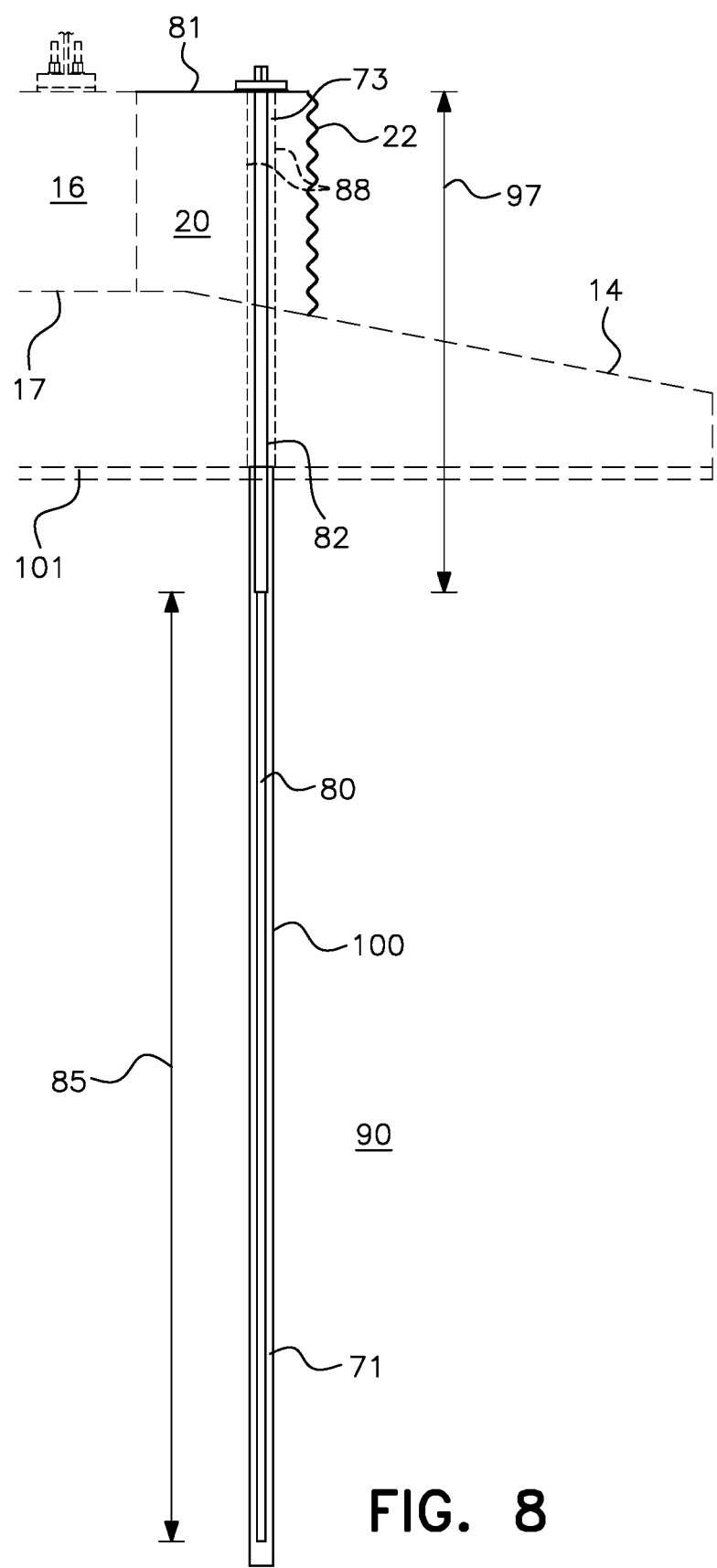
FIG. 8 shows a soil and/or rock anchor bolt in a partial cutaway view of one side of the original foundation as retrofitted with the reinforcing structure addition of the present invention.

As shown in FIGS. 4, 5 and 8, a plurality of soil and/or rock anchor bolts 80 are placed to extend vertically from the upper surface 81 of the cementitious annular ring 26 of the collar 20 down through the horizontal spread section 14 of the gravity spread foundation and into the underlying soil and/or rock substrate 90. The soil and/or rock anchor bolts 80, or anchors, are between about 25' and about 40' in length, and preferably are about 30' in length. The upper end of the anchor bolts is preferably enclosed within a sleeve 82 to prevent engagement of the bolt with the cementitious material in a "no bond" area 97 (see FIG. 8). The extent of the "no bond" area 97 is defined by the sleeve 82 that is preferably at least 10' in length. The sleeve 82 extends substantially through the height of the collar 20, through the spread section 14 of the foundation and about two to three feet into the underlying soil and/or rock substrate 90. In the embodiment shown, the distance from the upper surface 81 of the collar to the bottom 101 of the spread section is approximately 7.5', with the 10' sleeve extending about an additional 2.5' into the underlying substrate. The lower bonded area 85 of the anchor bolts, below the horizontal spread section 14 and extending into the underlying soil and/or rock substrate 90, is generally between about 14' and about 30' in length, and is preferably about 19' in length. The total embedment length of the soil and/or rock anchor bolts 80, including the bonded 85 and "no bond" 97 areas, is generally on the order of between about 24' and about 39', and preferably is about 29'. Following, construction of the collar, the soil and/or rock anchor bolts are post-tensioned in the "no bond" area to about 60% of their ultimate strength.

If the cementitious material of the retrofit collar addition is to be poured before the soil and/or rock anchor bolts are drilled, tubular PVC sleeves 88 about 6" in diameter are placed vertically in the excavated region for the anchor bolts (see FIGS. 8 and 8A) and secured for the concrete pour. Once the cementitious material is set, the soil and/or rock anchor bolts are drilled down through the hollow center of the PVC sleeves 88 and, to prevent water entry, the upper 3" of the drill hole sleeve 88 is filled with foam 91 as shown in FIG. 8A.

Figure 9:
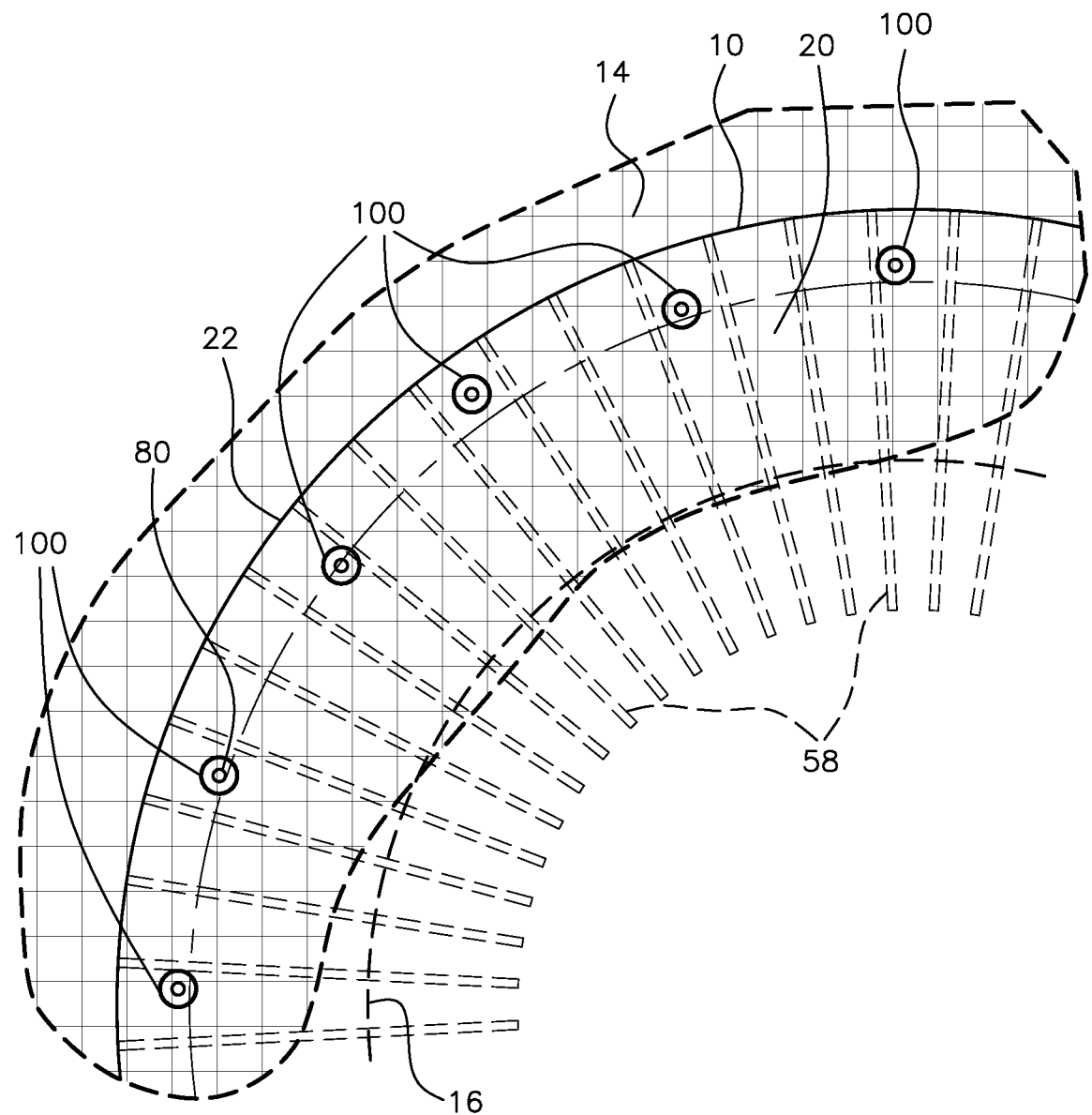
FIG. 9 is an enlarged view of Detail 9 shown in FIG. 5, without the radial bolts inserted in the radial bolt holes, depicting the manner in which the drill holes for the anchor bolts are spaced from the three radial bolt layers shown in FIGS. 6A-6C, 7A and 7B and staggered radially with respect to each other.

The anchor bolts are drilled in holes 100 in between adjoining radial bolt holes 58 in each radial bolt layer as shown in FIG. 9 such that the anchor bolts 80 and the radial bolts 40 inserted in the holes 58 do not interfere with one another. The diameter of the drill hole 100 for the rock anchor bolts is between about 4" and about 6", and is preferably about 5.5". When the anchor bolts are in place in the drill holes 100, grout is poured into the annular space 71 around the lower end of the anchor bolts in the bonded area 85 and in the annular space 73 between the outer surface of the sleeves 82 and the inner surface of the PVC tubes 88 in the "no-bond" area 97. The anchor bolts 80 are post-tensioned in the manner described in my prior patents to place the entire collar 20 and spread foundation 12 under high unit compression loading.

Figure 10:
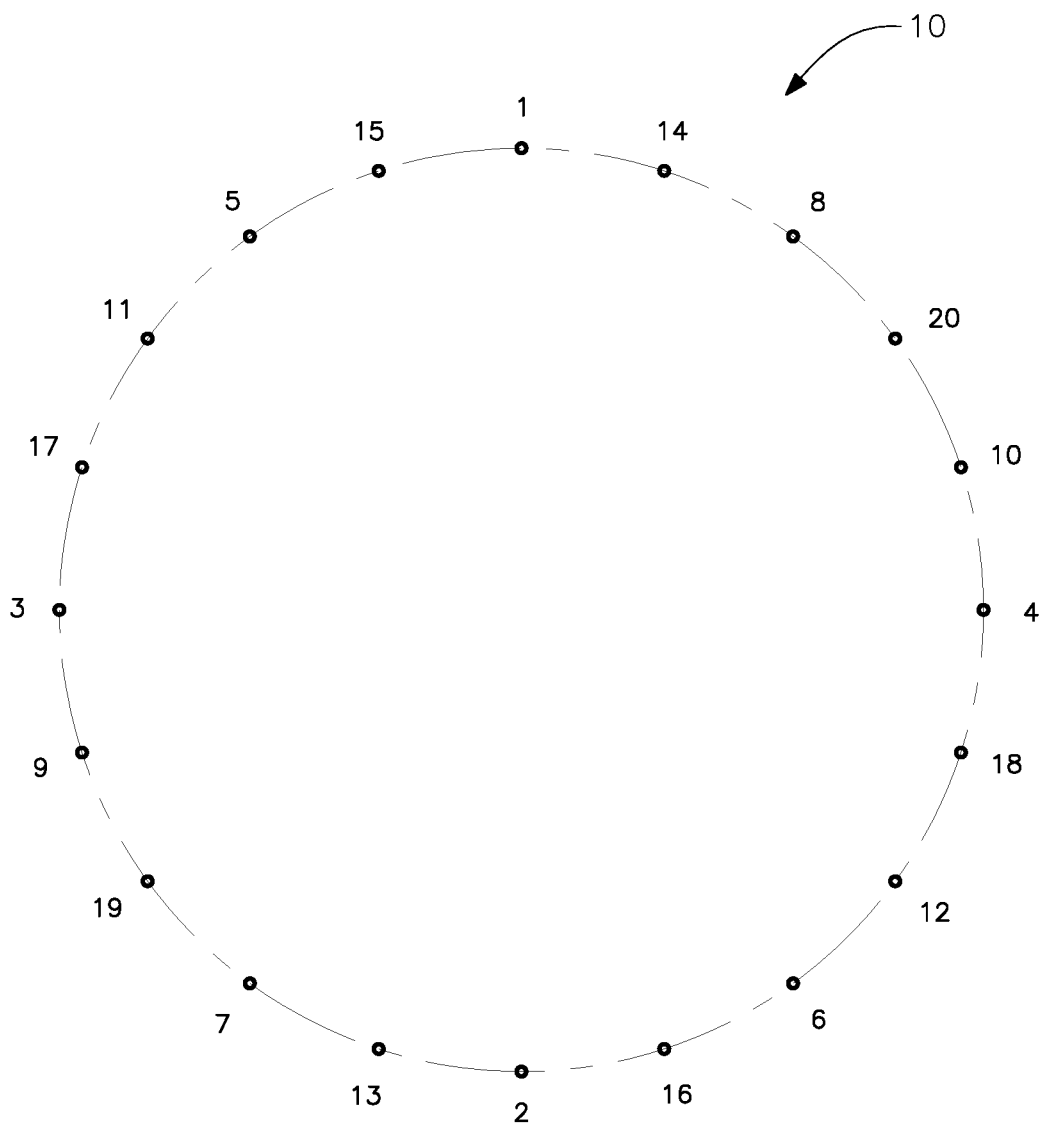
FIG. 10 is a top view of the circumference of the retrofit collar showing the soil and/or rock anchor bolt locations and a preferred sequence order for tensioning the soil and/or rock anchor bolts when installing the collar.

A preferred sequence for tensioning of the anchor bolts is shown in FIG. 10. As shown, the first and second bolts to be tensioned are on opposite sides of the collar, and the third and fourth bolts to be tensioned are on opposite sides that are 90° out from the first and second bolts. The soil and/or rock anchor bolts 80 are tensioned in opposing pairs as set forth in FIG. 10 to ensure even and uniform tension on the collar. The soil and/or rock anchor bolts may be part of rock anchors, soil anchors, helical anchors and the like, depending upon the makeup of the underlying support substrate.

The soil and/or rock anchor bolts, in conjunction with the collar that supports and contains the pedestal, serve to reinforce and strengthen the cold joint engaging interface 17 between the bottom of the pedestal and the top of the spread section under the pedestal. With the radial bolts horizontally securing the collar to the pedestal, and the anchor bolts providing a vertical connection of the collar to the spread section, the reinforcing addition of the present invention effectively provides compressive force on the engaging interface 17 to increase the strength, stiffness and load bearing capacity of the spread foundation.

A preferred construction sequence for constructing the reinforcing collar according to the present invention as follows:

1) construct temporary turbine supports (temporary guys or brackets);
2) excavate soil from atop the spread foundation for construction of retrofit collar; pile soil adjacent to the retrofit excavation;
3) expose rebar at radial bolt and rock anchor locations;
4) core two 2" diameter holes 24" long into foundation pedestal for each bolt;
5) expand the 2" core to 2.5" for the first 3" of the core;
6) drill 1.75" hole with percussion drill beyond the 2" cored hole to within about 30" of the center of the pedestal for each radial bolt; radial bolt holes extend about 1" beyond the end of the 0.5" radial bolt;
7) inject approximately 30 cubic inches of epoxy into the back of the holes drilled for the radial bolts;
8) insert into each radial bolt hole the 1.5" grade 75 all thread radial bolt with PVC sleeve sealed at the end of the PVC to the bolt with epoxy;
9) turn the couplers onto the bolt;
10) turn into the coupler the sleeved outer 4.5' of 1.5" grade 75 all thread bolt with wire tied strand hoops on the upper and lower radial bolt circles;
11) insert multi-plate CMP sections over radial bolts and bolt CMP sections together;
12) place half oval washers over radial bolts into the CMP depressions; turn nuts onto the radial bolts and snug against the washers;
13) place 6" PVC tubes vertical for rock anchors to be drilled through and secure for concrete pour;
14) pour concrete retrofit;
15) drill and install rock anchors, centralized, and grouted in place in the bond and "no bond" areas, upper ends of said rock anchors being enclosed within a sleeve in the "no bond" area;
16) post-tension radial bolts;
17) install rock anchor plates grouted in place; and
18) post-tension rock anchors.

The steps to be undertaken with respect to a wind turbine installed on an existing gravity spread foundation before and after installing the reinforcing collar according to the present invention are as follows:

1) coordinate retrofit foundation work with electrical work;
2) verify turbine de-energized before any work is begun;
3) provide backup power generator to allow for control of the wind turbine in an idling condition;
4) disconnect cables from transformers;
5) temporarily remove and store the transformer for reinstallation;
6) demolish the transformer concrete pad, if necessary to remove the pad;
7) temporarily remove the existing stairs and store for reinstallation;
8) demolish the existing stair landing concrete slab, if necessary;
9) locate grounding wires and protect during excavation; if necessary reroute or disconnect and reinstall grounding wires as needed;
10) control water that enters the excavation and the turbine pad;
11) remove anchor bolt caps and grout from caps and bolt threads;
12) relax the tower anchor bolts and thoroughly clean the threads;
13) maintain tower anchor bolt nuts in a tight and snug condition; tighten with impact wrench to snug condition;
14) repair or reinstall ground wires as required;
15) route or reroute conduit as required;
16) remove the temporary supports after the retrofit foundation has been constructed complete in place and concrete cured;
17) construct new support slab and conduit vault for transformer, if required;
18) restore anchor bolt tension;
19) reinstall tower access stair; and
20) reinstall transformer and connect the electrical cables.

The anchor bolts are tightened so as to exceed the maximum internal tension expected from overturning forces of the wind turbine structure on the foundation. As a result, the entire foundation with the reinforcing collar is able to withstand the various loads with the concrete thereof always remaining in compression and both the radial and the soil and; or rock anchor bolts always in static tension. As a result, the reinforcing structure addition according to the present invention can extend the life of an original gravity spread foundation that would otherwise have failed or is failing by at least an additional 20-25 year.

The present invention is also directed to a method of modifying an existing gravity spread reinforced concrete foundation, increasing the foundation stiffness and the rotational stiffness of the entire wind turbine structure. Modifying the existing gravity spread foundation also increases the turbine resistance to overturn and extends the foundation life by at least an additional 25 years, which is the expected turbine life.

The present invention also includes a method of modifying an existing shallow gravity spread foundation to a deep foundation, alleviating a number of potential failures found in connection with shallow foundations. These failures can include overturn, frost heave, erosion and scour, differential settlement, tilting, foundation/soil gapping, flooding, vertical seismic acceleration, horizontal seismic acceleration, liquefaction, collapsible soils and expansive soils.

Finally, the present invention provides a method of restoring integrity and continued use to a failed or failing concrete gravity spread foundation. As evident from the foregoing description, the retrofit reinforcement structure addition including the collar with radial bolts and soil and/or rock anchor bolts extending horizontally and vertically through the collar, respectively, serves to reinforce, strengthen and provide compressive force upon the engaging interface between the bottom of the pedestal and the top of the spread section under the pedestal. When restored and supported by the retrofit reinforcement structure addition of the present invention, the useful life of an otherwise failed or failing gravity foundation is extended for at least an additional 25 years which is the expected turbine life period.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A method of installing a retrofit spread foundation reinforcing structure addition onto an existing concrete gravity spread foundation having a concrete central pedestal and a concrete spread section, the existing concrete gravity spread foundation already supporting a tower or wind turbine and being a completed structure before the retrofit spread foundation reinforcing structure addition is installed on said existing concrete gravity spread foundation to extend the useful life thereof, the retrofit spread foundation reinforcing structure addition including a cementitious annular collar having an outer perimeter that includes a shape sustaining member, a plurality of radial bolts extending horizontally through the collar and into the concrete central pedestal, and a plurality of vertically oriented anchor bolts extending downwardly through the collar and the spread section of the foundation, the method comprising the steps of:

identifying an existing concrete gravity spread foundation having a concrete central pedestal and a concrete spread section to be reinforced;

drilling a plurality of horizontally extending core holes in the sides of the concrete central pedestal of the already existing concrete gravity spread foundation for the radial bolts of the retrofit spread foundation reinforcing structure addition;

inserting the radial bolts into said horizontally extending core holes in the sides of the concrete central pedestal;

encircling the concrete central pedestal of the already existing concrete gravity spread foundation with the shape-sustaining member of the retrofit spread foundation reinforcing structure addition to define a generally annular ring around the concrete central pedestal of the already existing concrete gravity spread foundation;

placing a plurality of sleeve members in a vertical orientation in the generally annular ring for the anchor bolts of the retrofit spread foundation reinforcing structure addition to be drilled through and securing the sleeve members for concrete pour;

pouring concrete into the generally annular ring between the shape-sustaining member of the retrofit spread foundation reinforcing structure addition and the concrete central pedestal of the already existing concrete gravity spread foundation to form the cementitious annular collar, said annular collar encircling the concrete central pedestal and pressing down upon the spread section of the already existing concrete gravity spread foundation;

drilling and installing the anchor bolts, generally centralized in said sleeve members, lower ends of said anchor bolts extending vertically through the gravity spread section and into the underlying substrate constituted by at least one of soil and rock lying beneath the concrete spread section of the existing concrete gravity spread foundation;

post-tensioning the radial bolts; and post-tensioning the anchor bolts.

2. The method as set forth in claim 1, further comprising, before the step of inserting radial bolts into said horizontally extending core holes in the sides of the pedestal, the step of injecting an adhesive into inner ends of said horizontally extending core holes to secure the radial bolts.

3. The method as set forth in claim 2, wherein the adhesive is epoxy.

4. The method as set forth in claim 1, wherein the step of encircling the pedestal with the shape-sustaining member includes inserting multi-plate corrugated metal pipe (CMP) sections over the radial bolts and bolting the CMP sections together to form said shape sustaining member.

5. The method as set forth in claim 1, wherein said step of drilling and installing anchor bolts generally centralized in said sleeve members includes grouting said anchor bolts in place.

6. The method as set forth in claim 1, wherein said sleeve members are PVC tubes.

7. The method as set forth in claim 1, further comprising, before the step of drilling a plurality of horizontally extending core holes in the sides of the concrete pedestal for the radial bolts, the step of:

excavating soil from atop the concrete spread section of the foundation for construction of the retrofit collar.

8. A method of modifying an existing gravity spread reinforced concrete foundation having a concrete pedestal and a concrete spread section that abut one another at an engaging interface, said existing gravity spread reinforced concrete foundation already supporting a wind turbine structure and being a completed structure before being modified, said method of modifying serving to increase stiffness of the existing foundation, rotational stiffness of the wind turbine structure, and turbine resistance to overturn through addition of a reinforcing structure to said completed structure, said method comprising steps of confining the concrete pedestal of the already existing gravity spread foundation with the reinforcing structure so that the reinforcing structure surrounds and is structurally engaged with the concrete pedestal, and reinforcing the concrete pedestal and the engaging interface between the concrete pedestal and the concrete spread section using the reinforcing structure, said steps of confining and reinforcing including the steps of:

drilling a plurality of horizontally extending core holes in the sides of the concrete pedestal for a plurality of horizontally extending sleeved radial bolts;

inserting the sleeved radial bolts into said horizontally extending core holes in the sides of the concrete pedestal to obtain said structural engagement;

encircling the concrete pedestal with a shape-sustaining member to define an annular ring between an outer side surface of the concrete pedestal and the shape-sustaining member, said sleeved radial bolts extending through said annular ring and said shape-sustaining member;

filling the annular ring with cementitious material to form concrete collar that surrounds the concrete pedestal, said sleeved radial bolts being embedded in said concrete collar with ends thereof extending beyond an outer surface of said shade-sustaining member, a base of the concrete collar pressing on an upper surface of the concrete spread section of the foundation; and post-tensioning the horizontally extending sleeved radial bolts at the extending ends thereof.

9. The method as set forth in claim 8, further comprising, after the step of inserting the sleeved radial bolts into said horizontally extending core holes in the sides of the concrete pedestal, the step of securing the inner ends of the radial bolts with adhesive.

10. The method as set forth in claim 9, wherein the adhesive is epoxy.

11. The method as set forth in claim 8, wherein, before said step of filling the annular ring with cementitious material, said step of reinforcing includes the steps of placing PVC tubes substantially vertically in said annular space and securing said tubes for pour of said cementitious material.

12. The method as set forth in claim 11, further comprising, after pouring and curing of said cementitious material, the step of drilling a plurality of vertically extending anchor bolts through said tubes in said concrete collar and into an underlying substrate of at least one of soil and rock beneath said concrete spread section, upper ends of said anchor bolts extending above an upper surface of said concrete collar for post-tensioning thereof.

13. The method as set forth in claim 8, wherein, said step of drilling a plurality of horizontally extending core holes in the sides of the concrete pedestal includes drilling holes at three vertically spaced levels such that radial bolts fitted in said holes form an upper generally horizontal radial bolt layer, a middle generally horizontal radial bolt layer and a lower generally horizontal radial bolt layer, radial bolts in said upper, middle and lower layers being vertically offset from one another.

14. The method as set forth in claim 13, further comprising the step of the circumferentially reinforcing the upper and lower bolt layers with wire-tied strand hoops at about 6" intervals.

* * * * *